United States Patent
Yoshida

(10) Patent No.: US 12,148,171 B2
(45) Date of Patent: Nov. 19, 2024

(54) MOVEMENT AMOUNT ESTIMATION DEVICE, MOVEMENT AMOUNT ESTIMATION METHOD, AND COMPUTER READABLE MEDIUM

(71) Applicant: Mitsubishi Electric Corporation, Tokyo (JP)

(72) Inventor: Michinori Yoshida, Tokyo (JP)

( * ) Notice: Subject to any disclaimer, the term of this patent is extended or adjusted under 35 U.S.C. 154(b) by 592 days.

(21) Appl. No.: 17/466,835

(22) Filed: Sep. 3, 2021

(65) Prior Publication Data

US 2021/0398292 A1    Dec. 23, 2021

Related U.S. Application Data

(63) Continuation of application No. PCT/JP2019/017613, filed on Apr. 25, 2019.

(51) Int. Cl.
*G06T 7/246*        (2017.01)
*G06F 18/2433*   (2023.01)
(Continued)

(52) U.S. Cl.
CPC .......... *G06T 7/207* (2017.01); *G06F 18/2433* (2023.01); *G06T 7/246* (2017.01);
(Continued)

(58) Field of Classification Search
CPC .......... G06T 7/20; G06T 7/246; G06T 7/248; G06T 7/254; G06T 7/55; G06T 7/579;
(Continued)

(56) References Cited

U.S. PATENT DOCUMENTS 9,098,754 B1    8/2015   Stout et al.
2001/0055063 A1   12/2001   Nagai et al.
(Continued)

FOREIGN PATENT DOCUMENTS

CN    102714695 A    10/2012
CN    109100741 A    12/2018
(Continued)

OTHER PUBLICATIONS

Chinese Office Action and Search Report for Chinese Application No. 201980095501.3, dated Jan. 11, 2024, with an English translation.
(Continued)

*Primary Examiner* — Andrew W Johns
(74) *Attorney, Agent, or Firm* — Birch, Stewart, Kolasch & Birch, LLP

(57) ABSTRACT

An image acquisition unit (110) acquires an image of an area around a mobile object as image data (31). A point cloud acquisition unit (120) acquires depth point cloud data (32) representing a depth, which is a distance to an object existing in the area around the mobile object, by a point cloud. A generation unit (140) calculates a depth to a position represented by a pixel included in the image data (31), using the image data (31) and the depth point cloud data (32), and generates high-resolution point cloud data (35) in which the calculated depth is added to the pixel included in the image data (31). An estimation unit (150) estimates a movement amount of the mobile object, using the high-resolution point cloud data (35).

8 Claims, 10 Drawing Sheets

(51) Int. Cl.
*G06T 7/207* (2017.01)
*G06T 7/579* (2017.01)
*G06V 20/00* (2022.01)

(52) U.S. Cl.
CPC .............. *G06T 7/579* (2017.01); *G06V 20/00* (2022.01); *G06T 2207/10028* (2013.01); *G06V 2201/07* (2022.01)

(58) Field of Classification Search
CPC . G06T 7/97; G06T 2207/10028; G06V 10/40; G06V 10/62; G06V 20/56; G05D 1/0231; G05D 1/0246; G05D 1/0248; G05D 1/0253
See application file for complete search history.

(56) References Cited

U.S. PATENT DOCUMENTS

| | | |
|---|---|---|
| 2008/0075326 A1 | 3/2008 | Otani et al. |
| 2012/0281922 A1 | 11/2012 | Yamada et al. |
| 2014/0270484 A1 | 9/2014 | Chandraker et al. |
| 2015/0379766 A1 | 12/2015 | Newman et al. |
| 2016/0035081 A1 | 2/2016 | Stout et al. |
| 2016/0313444 A1 | 10/2016 | Kurata et al. |
| 2020/0132471 A1 | 4/2020 | Kaneko et al. |
| 2020/0209401 A1 | 7/2020 | Motoyama et al. |

FOREIGN PATENT DOCUMENTS

| | | |
|---|---|---|
| CN | 109242862 A | 1/2019 |
| JP | 2001-84383 A | 3/2001 |
| JP | 2002-48513 A | 2/2002 |
| JP | 2008-82707 A | 4/2008 |
| JP | 2010-287156 A | 12/2010 |
| JP | 2011-48706 A | 3/2011 |
| JP | 2012-88114 A | 5/2012 |
| JP | 2012-220471 A | 11/2012 |
| JP | 2015-212942 A | 11/2015 |
| JP | 2016-516249 A | 6/2016 |
| JP | 2016-516977 A | 6/2016 |
| JP | 2017-40530 A | 2/2017 |
| JP | 2017-58166 A | 3/2017 |
| JP | 2017-129508 A | 7/2017 |
| JP | 2018-205142 A | 12/2018 |
| JP | 2019-28861 A | 2/2019 |
| WO | 2015/097824 A1 | 7/2015 |

OTHER PUBLICATIONS

International Search Report for PCT/JP2019/017613 mailed on Jun. 4, 2019.

Japanese Notice of Reasons for Refusal, issued in corresponding JP Application No. 2019-556369 dated Nov. 19, 2019.

MOVEMENT AMOUNT ESTIMATION DEVICE, MOVEMENT AMOUNT ESTIMATION METHOD, AND COMPUTER READABLE MEDIUM

CROSS REFERENCE TO RELATED APPLICATION

This application is a Continuation of PCT International Application No. PCT/JP2019/017613, filed on Apr. 25, 2019, which is hereby expressly incorporated by reference into the present application.

TECHNICAL FIELD

The present invention relates to a movement amount estimation device, a movement amount estimation method, and a movement amount estimation program.

BACKGROUND ART

In a conventional method, when a point cloud map is generated based on sensor information, a movement amount and a depth are estimated based on feature values in only point clouds obtained by a laser sensor or camera images obtained by a camera.

In order to improve accuracy, Patent Literature 1 proposes using a plurality of sensors to calculate odometry values individually by each of the sensors, and then finding an optimal solution for a movement amount based on these odometry values.

CITATION LIST

Patent Literature

Patent Literature 1: JP 2017-058166 A

SUMMARY OF INVENTION

Technical Problem

In a method using three-dimensional shapes of point clouds obtained by a laser sensor, odometry values can be calculated by matching features with three-dimensional shapes such as protrusions and recesses. In a method using camera images, a movement amount between frames is estimated based on feature values in the camera images. In the method using three-dimensional shapes, odometry values cannot be calculated in a place where there are no features of three-dimensional shapes. In the method using camera images, odometry values cannot be calculated highly accurately due to large errors in depth information.

In Patent Literature 1, a calculation of an odometry value is performed based on camera images, and a calculation of an odometry value is also performed based on point clouds obtained by a laser sensor, and then based on these odometry values, an odometry value with a high likelihood is calculated. However, the technique of Patent Literature 1 has a problem which is that an odometry value with high accuracy cannot be calculated if each of the calculations is not reliable.

It is an object of the present invention to highly accurately calculate a movement amount of a mobile object.

Solution to Problem

A movement amount estimation device according to the present invention is mounted on a mobile object and estimates a movement amount of the mobile object, and the movement amount estimation device includes
  an image acquisition unit to acquire an image of an area around the mobile object as image data;
  a point cloud acquisition unit to acquire depth point cloud data representing a depth, which is a distance to an object existing in the area around the mobile object, by a point cloud;
  a generation unit to calculate a depth to a position represented by a pixel included in the image data, using the image data and the depth point cloud data, and generate high-resolution point cloud data in which the calculated depth is added to the pixel included in the image data; and
  an estimation unit to estimate the movement amount of the mobile object, using the high-resolution point cloud data.

Advantageous Effects of Invention

In a movement amount estimation device according to the present invention, a generation unit calculates a depth to a position represented by a pixel included in image data, using the image data and depth point cloud data, and generates high-resolution point cloud data in which the calculated depth is added to the pixel included in the image data. Then, an estimation unit estimates a movement amount of a mobile object, using the high-resolution point cloud data. In this way, the movement amount estimation device according to the present invention estimates the movement amount of the mobile object, using the high-resolution point cloud data in which the image data and the depth point cloud data are integrated, and thus provides an effect of being able to highly accurately calculate the movement amount of the mobile object.

DESCRIPTION OF EMBODIMENTS

An embodiment of the present invention will be described hereinafter with reference to the drawings. Throughout the

First Embodiment

*Description of Configuration*

Figure 1:
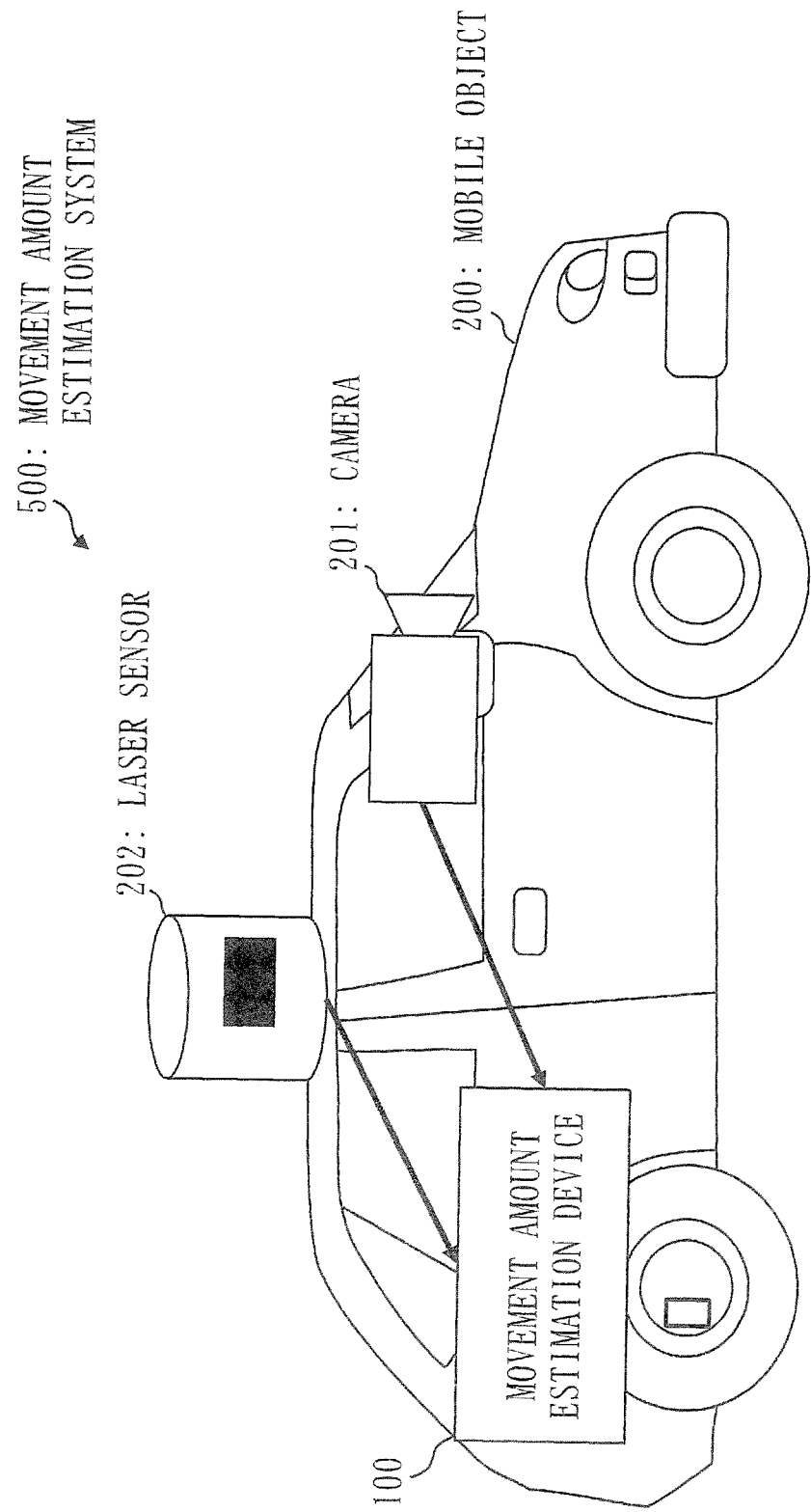
FIG. 1 is an overall configuration diagram of a movement amount estimation system according to a first embodiment.

FIG. 1 is an overall configuration diagram of a movement amount estimation system 500 according to this embodiment.

The movement amount estimation system 500 includes a movement amount estimation device 100, a camera 201, and a laser sensor 202. The movement amount estimation device 100, the camera 201, and the laser sensor 202 are mounted on a mobile object 200.

The movement amount estimation device 100 is mounted on the mobile object 200, and estimates a movement amount of the mobile object 200.

The mobile object 200 is an object that moves. Specifically, the mobile object 200 is a vehicle.

The camera 201 is mounted on the mobile object 200, captures an image of an area around the mobile object 200, and outputs image data 31. Specifically, the image data 31 is a camera image.

The laser sensor 202 is mounted on the mobile object 200, and outputs depth point cloud data 32 representing depths, which are distances to objects existing in the area around the mobile object 200, by a point cloud. Specifically, the laser sensor 202 is a lidar.

The camera 201 and the laser sensor 202 may perform measurement in an area only in front or perform measurement in an area all around.

Figure 2:
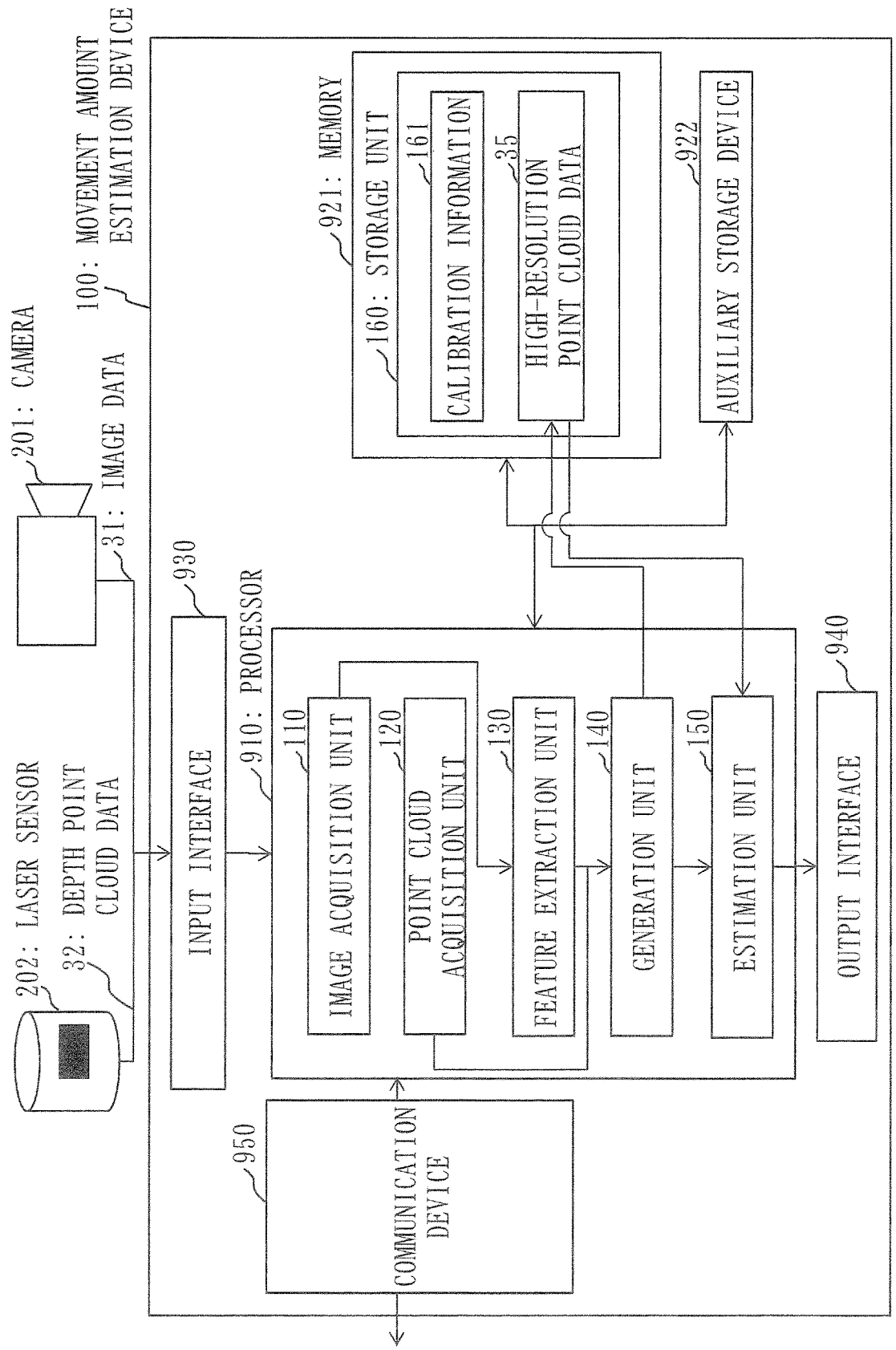
FIG. 2 is a configuration diagram of a movement amount estimation device according to a first embodiment.

FIG. 2 is a configuration diagram of the movement amount estimation device 100 according to this embodiment.

The movement amount estimation device 100 is a computer. The movement amount estimation device 100 includes a processor 910, and also includes other hardware components such as a memory 921, an auxiliary storage device 922, an input interface 930, an output interface 940, and a communication device 950. The processor 910 is connected with the other hardware components via signal lines, and controls these other hardware components.

The movement amount estimation device 100 includes, as functional elements, an image acquisition unit 110, a point cloud acquisition unit 120, a feature extraction unit 130, a generation unit 140, an estimation unit 150, and a storage unit 160. The storage unit 160 stores calibration information 161 and high-resolution point cloud data 35 of an immediately preceding frame.

The functions of the image acquisition unit 110, the point cloud acquisition unit 120, the feature extraction unit 130, the generation unit 140, and the estimation unit 150 are realized by software. The storage unit 160 is provided in the memory 921. Alternatively, the storage unit 160 may be provided in the auxiliary storage device 922. Alternatively, the storage unit 160 may be divided and provided in the memory 921 and the auxiliary storage device 922.

The processor 910 is a device that executes a movement amount estimation program. The movement amount estimation program is a program that realizes the functions of the image acquisition unit 110, the point cloud acquisition unit 120, the feature extraction unit 130, the generation unit 140, and the estimation unit 150. The processor 910 is an integrated circuit (IC) that performs operational processing. Specific examples of the processor 910 are a central processing unit (CPU), a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disc.

The input interface 930 is a port to be connected with an input device such as a mouse, a keyboard, or a touch panel. Specifically, the input interface 930 is a Universal Serial Bus (USB) terminal. The input interface 930 may be a port to be connected with a local area network (LAN).

The image acquisition unit 110 acquires the image data 31 from the camera 201 via the input interface 930. The point cloud acquisition unit 120 acquires the depth point cloud data 32 from the laser sensor 202 via the input interface 930.

The output interface 940 is a port to which a cable of an output device such a display is to be connected. Specifically, the output interface 940 is a USB terminal or a High Definition Multimedia Interface (HDMI, registered trademark) terminal. Specifically, the display is a liquid crystal display (LCD).

The communication device 950 has a receiver and a transmitter. The communication device 950 is connected wirelessly to a communication network, such as a LAN, the Internet, or a telephone line. Specifically, the communication device 950 is a communication chip or a network interface card (NIC). The movement amount estimation device 100 may acquire the image data 31 or the depth point cloud data 32 via the communication device 950.

The movement amount estimation program is read by the processor 910 and executed by the processor 910. The memory 921 stores not only the movement amount estimation program but also an operating system (OS). The processor 910 executes the movement amount estimation program while executing the OS. The movement amount estimation program and the OS may be stored in the auxiliary storage device 922. The movement amount estimation program and the OS stored in the auxiliary storage device 922 are loaded into the memory 921 and executed by the processor 910. Part or the entirety of the movement amount estimation program may be embedded in the OS.

The movement amount estimation device 100 may include a plurality of processors as an alternative to the processor 910. The plurality of processors share execution of the movement amount estimation program. Each of the processors is, like the processor 910, a device that executes the movement amount estimation program.

Data, information, signal values, and variable values that are used, processed, or output by the movement amount estimation program are stored in the memory 921 or the auxiliary storage device 922, or stored in a register or a cache memory in the processor 910.

"Unit" of each of the image acquisition unit 110, the point cloud acquisition unit 120, the feature extraction unit 130, the generation unit 140, and the estimation unit 150 may be interpreted as "process", "procedure", or "step". "Process"

of each of the image acquisition process, the point cloud acquisition process, the feature extraction process, the generation process, and the estimation process may be interpreted as "program", "program product", or "computer readable recording medium recording a program".

The movement amount estimation program causes a computer to execute each process, each procedure, or each step, where "unit" of each of the above units is interpreted as "process", "procedure", or "step". A movement amount estimation method is equivalent to each procedure, where "unit" of each of the above units is interpreted as "procedure".

The movement amount estimation program may be stored and provided in a computer readable recording medium. Alternatively, the movement amount estimation program may be provided as a program product.

*Description of Operation*

Figure 3:
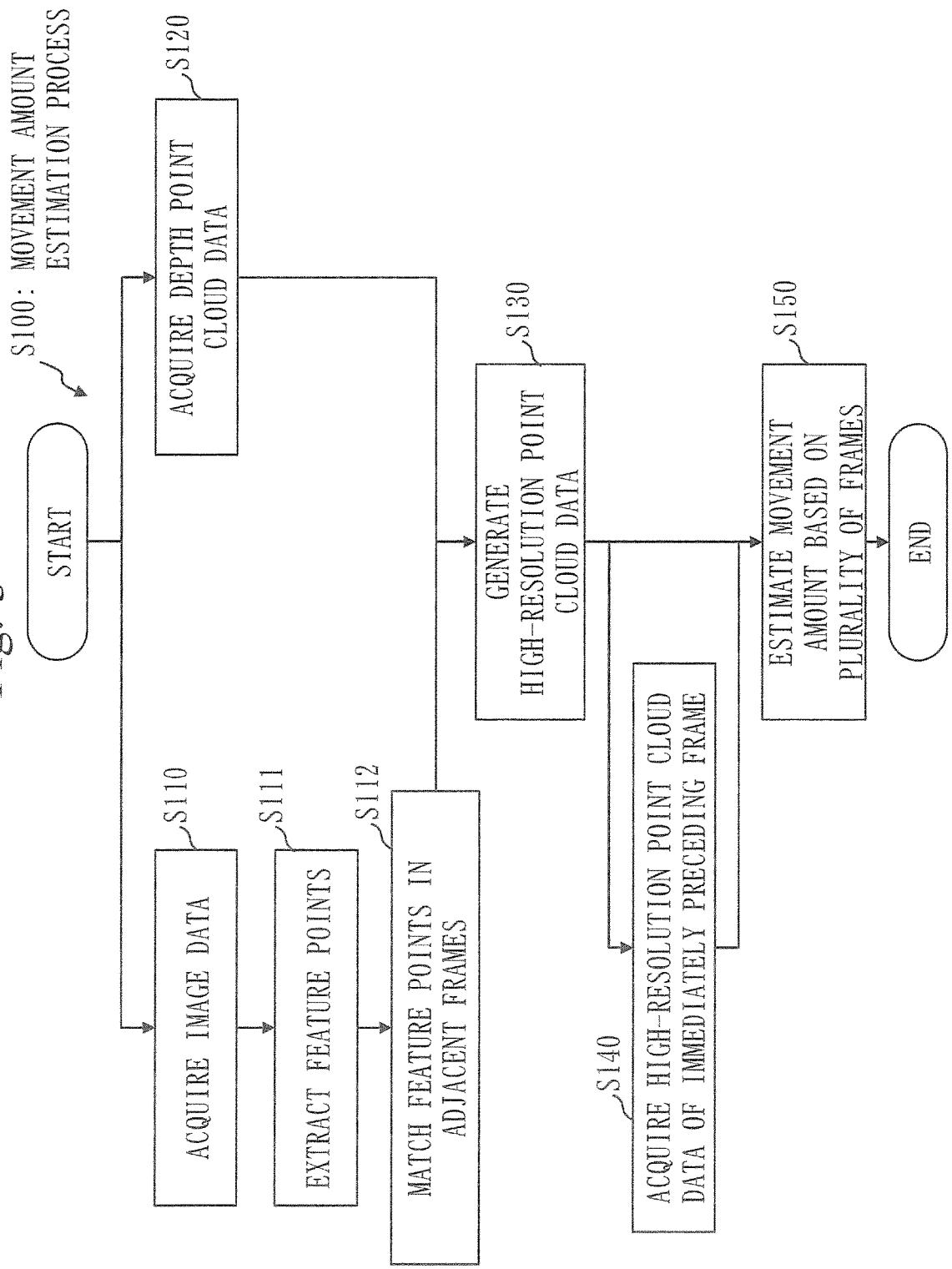
FIG. 3 is a flowchart of a movement amount estimation process by the movement amount estimation device according to the first embodiment.

FIG. 3 is a flowchart of a movement amount estimation process S100 by the movement amount estimation device 100 according to this embodiment.

Figure 4:
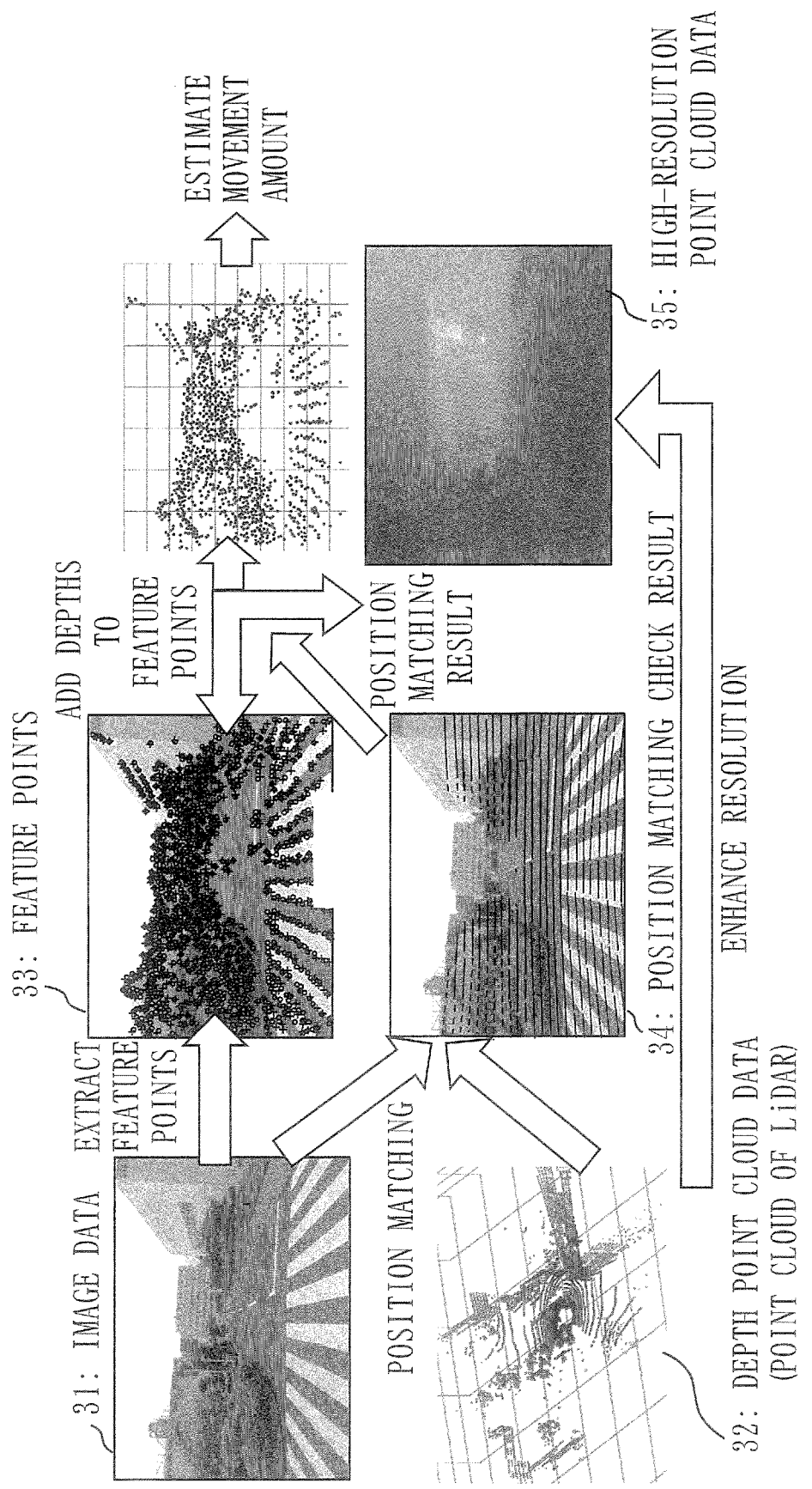
FIG. 4 is a diagram illustrating a specific example of the movement amount estimation process by the movement amount estimation device according to the first embodiment.

FIG. 4 is a diagram illustrating a specific example of the movement amount estimation process S100 by the movement amount estimation device 100 according to this embodiment.

The camera 201 and the laser sensor 202 are calibrated in advance. By this calibration, a rotation matrix R and a translation matrix T for matching the center coordinates of the image data 31, which is a camera image, and the center coordinates of the depth point cloud data 32 by coordinate transformation are obtained. The rotation matrix R and the translation matrix T are stored as the calibration information 161 in the storage unit 160 of the movement amount estimation device 100. In this embodiment, it is assumed that the depth point cloud data 32 is expressed in accordance with the center of the coordinate system of the image data 31. However, the coordinates of the image data 31 may be expressed in accordance with the center of the coordinate system of the depth point cloud data 32.

Let XL denote a point cloud in the coordinate system of the laser sensor 202, and $X_C$ denote a point cloud in the coordinate system of the camera 201. In this case, coordinate transformation can be performed by the following Formula 1.

$$\vec{X_c} = \begin{pmatrix} R & T' \\ 0 & 1 \end{pmatrix} \vec{X_L} \quad \text{[Formula 1]}$$

As a result of the coordinate transformation, the depth point cloud data 32 can be superimposed on the image data 31, as in a position matching check result 34 of FIG. 4. In the position matching check result 34 of FIG. 4, portions that look like transverse lines are the point cloud of the depth point cloud data 32 transformed into the coordinate system of the image data 31.

<Image Acquisition Process: Step S110>

In step S110, the image acquisition unit 110 acquires an image of an area around the mobile object 200 as image data 31. The image acquisition unit 110 acquires the image data 31, using the camera 201 mounted on the mobile object 200. Specifically, the image acquisition unit 110 acquires the image data 31 as illustrated in FIG. 4, that is, a camera image.

<Feature Point Extraction Process: Step S111, Step S112>

In step S111, the feature extraction unit 130 extracts pixels that are feature points from the image data 31. Specifically, the feature extraction unit 130 extracts pixels that are feature points from the image data 31, using an algorithm such as speeded-up robust features (SURF). Alternatively, feature points may be extracted from the image data 31 by a different method. Each of symbols ○ and x of feature points 33 in FIG. 4 represents feature points extracted in one frame. As a specific example, the symbols ○ and x represent feature points respectively extracted in two adjacent frames. A feature point in an image is referred to also as a feature value.

In step S112, the feature extraction unit 130 further extracts feature points in the image data of each of two adjacent frames. The feature extraction unit 130 searches for feature points corresponding to each other between the two adjacent frames. Sensing is performed at high speed, so that the feature extraction unit 130 may search for feature points corresponding to each other between the two adjacent frames by a method of matching points nearest to each other.

If feature points corresponding to each other are outliers, the feature extraction unit 130 excludes the feature points that are outliers from the feature points in the image data of the two adjacent frames. Specifically, the feature extraction unit 130 calculates distances between pairs of pixels of matching feature points between the adjacent frames, creates a histogram of these distances, and extracts outliers from the matching feature points. A specific example of a method for excluding outliers is random sample consensus (RANSAC).

It is assumed that the feature points 33 of FIG. 4 represent feature points after outliers have been excluded.

<Point Cloud Acquisition Process: Step S120>

In step S120, the point cloud acquisition unit 120 acquires depth point cloud data 32 representing depths, which are distances to objects existing around the mobile object 200, by a point cloud. The point cloud acquisition unit 120 acquires the depth point cloud data 32, using the laser sensor 202 mounted on the mobile object 200.

<Generation Process: Step S130>

In step S130, using the image data 31 and the depth point cloud data 32, the generation unit 140 calculates depths to respective positions represented by pixels included in the image data 31. Then, the generation unit 140 generates high-resolution point cloud data 35 in which the calculated depths are added to the pixels included in the image data 31.

Figure 5:
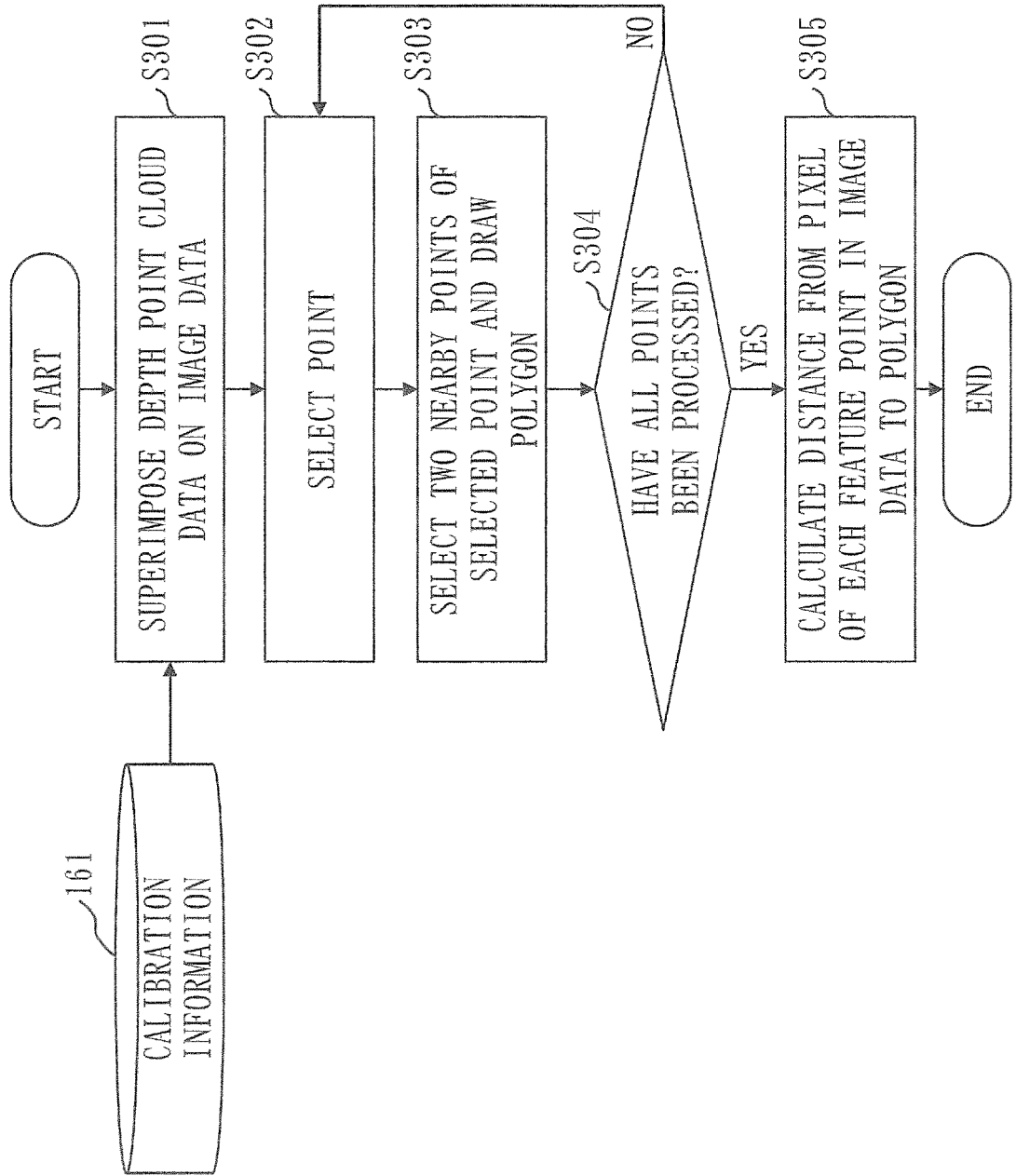
FIG. 5 is a flowchart illustrating operation of a generation unit according to the first embodiment.

FIG. 5 is a flowchart illustrating operation of the generation unit 140 according to this embodiment.

In step S301, the generation unit 140 transforms the coordinate system of the depth point cloud data 32 into the coordinate system of the image data 31. The generation unit 140 transforms the coordinate system of the depth point cloud data 32 into the coordinate system of the image data 31, using the rotation matrix R and the translation matrix T stored in the calibration information 161. The generation unit 140 transforms the coordinate system of the depth point cloud data 32 into the coordinate system of the image data 31 by the equation of Formula 1 described above, using the rotation matrix R and the translation matrix T.

Specifically, the depth point cloud data 32 output from the laser sensor 202 is data of an area 360 degrees around the mobile object 200.

Therefore, in order to match the depth point cloud data 32 and the image data 31, the generation unit 140 extracts only a point cloud within the camera image of the image data 31 from the point cloud as a result of the coordinate transformation of the depth point cloud data 32. That is, the generation unit 140 performs filtering on the point cloud as a result of the coordinate transformation of the depth point cloud data 32 so as to obtain only the point cloud within the camera image of the image data 31.

This allows the image data 31 and the depth point cloud data 32 to be superimposed as in the position matching check result 34 of FIG. 4.

The generation unit 140 renders the point cloud that remains after the filtering as polygons. As described above, the generation unit 140 superimposes the image data 31 and the depth point cloud data 32 on each other by transforming the coordinate system of the depth point cloud data 32 into the coordinate system of the image data 31. Then, the generation unit 140 selects a polygon that is formed with three points included in the depth point cloud data 32 and contains a pixel that is a feature point. Then, using the polygon, the generation unit 140 calculates the depth of a feature pixel position P1, which is the position of the pixel that is a feature point P.

Specifically, this is as described below.

Figure 6:
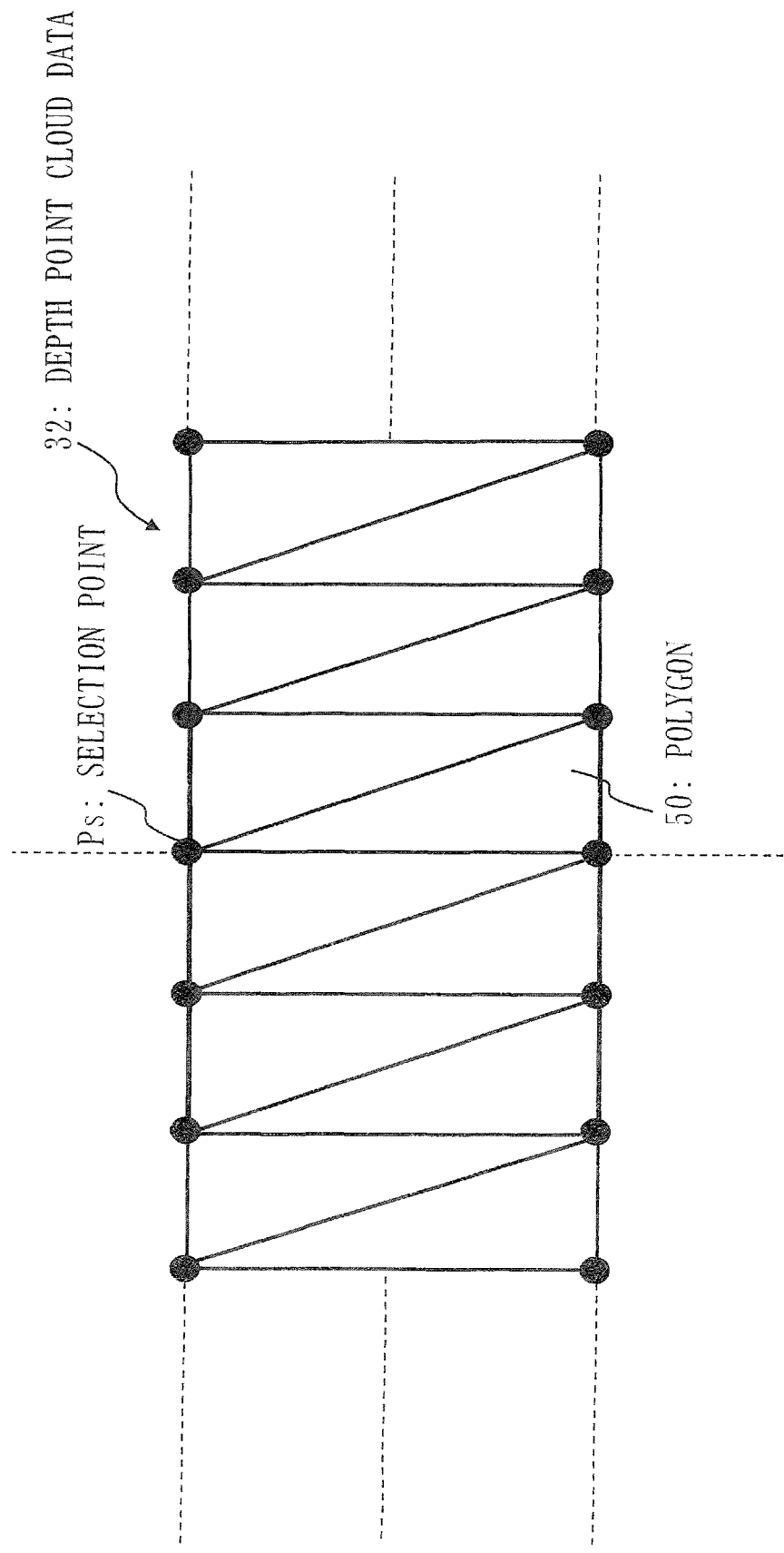
FIG. 6 is a schematic diagram of generating a polygon from depth point cloud data superimposed on image data according to the first embodiment.

FIG. 6 is a schematic diagram of generating a polygon 50 from the depth point cloud data 32 superimposed on the image data 31 according to this embodiment.

Figure 7:
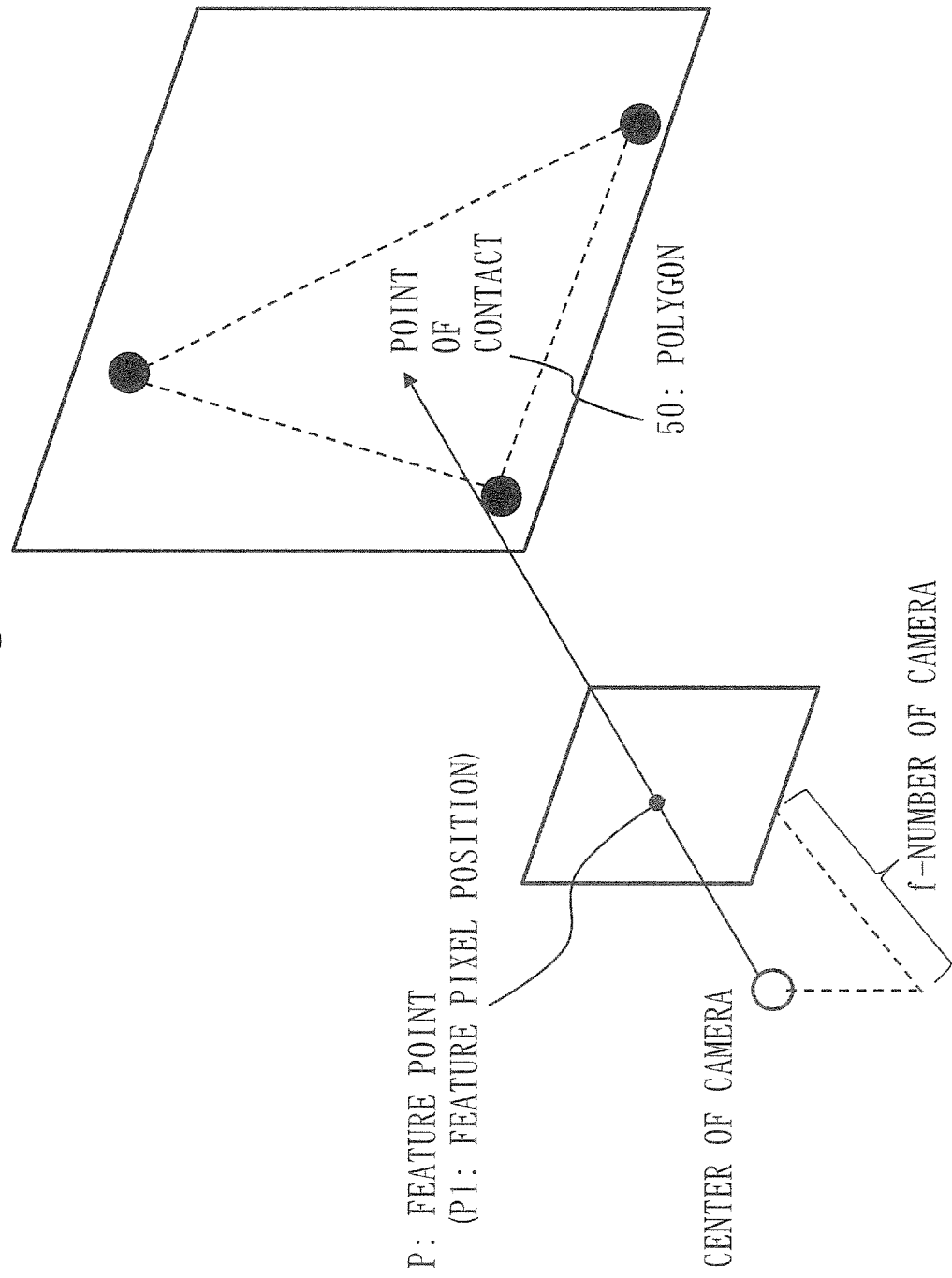
FIG. 7 is a diagram representing a notion of how high-resolution point cloud data is generated according to the first embodiment.

FIG. 7 is a diagram representing a notion of how the high-resolution point cloud data 35 is generated according to this embodiment.

As illustrated in the schematic diagram of the depth point cloud data 32 of FIG. 6, the depth point cloud data 32 is arranged to form a plurality of traverse lines traversing the image of the image data 31.

In step S302, the generation unit 140 selects a selection point Ps from the depth point cloud data 32. Then, in step S303, the generation unit 140 extracts two nearby points with respect to the selected point so as to form a plane by the three points in total. By this operation, the depth point cloud data 32 can be rendered as the polygon 50. Specifically, the same can be realized by a method using a Delaunay triangulation.

In step S304, the generation unit 140 determines whether the process to render the depth point cloud data 32 as polygons has been performed for all the points. If there remains a point for which the process has not been performed, the flow returns to step S302. If the process has been performed for all the points, the flow proceeds to step S305.

The generation unit 140 calculates, as the depth of the feature pixel position P1, the distance to a point of contact between the plane formed by the polygon 50 and an extended line of a line connecting the center of the camera 201 and the feature pixel position P1 of the image at an f-number determined depending on the focal length of the camera 201.

In step S305, the generation unit 140 calculates the distance from the feature point P of the image data 31 to the polygon 50. Specifically, as illustrated in FIG. 7, the generation unit 140 draws a line from the center of the camera to the feature pixel position P1, which is the position of the feature point P on the image at the f-number of the camera. Then, the distance to the point of contact between the plane formed by the polygon 50 and the extended line of the line from the center of the camera to the feature pixel position P1 on the image at the f-number of the camera is calculated as the depth. By this operation, the generation unit 140 can calculate the depth of the feature pixel position P1 represented by the pixel of each feature point P.

The generation unit 140 generates the high-resolution point cloud data 35 in which the depth of the feature pixel position P1, which is the position represented by the pixel that is the feature point P, is added to the pixel that is the feature point P.

Referring back to FIG. 3, the description will be continued.

In step S140, the generation unit 140 acquires high-resolution point cloud data 35 of an immediately preceding frame from the storage unit 160.

<Estimation Process: Step S150>

The estimation unit 150 estimates the movement amount of the mobile object 200, using the high-resolution point cloud data 35. The estimation unit 150 estimates the movement amount of the mobile object 200 by calculating the amount of change in the depth of the feature pixel position P1, using a plurality of frames. Lastly, the estimation unit 150 stores the current high-resolution point cloud data 35 as the high-resolution point cloud data 35 of the immediately preceding frame in the storage unit 160.

Specifically, this is as described below.

Figure 8:
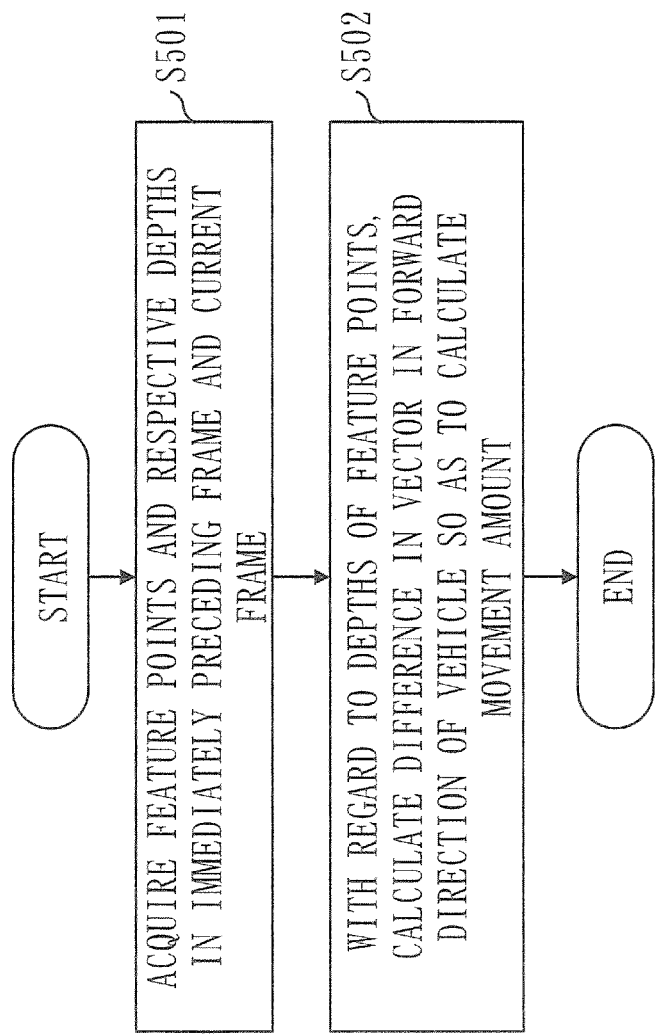
FIG. 8 is a flowchart illustrating operation of an estimation unit according to the first embodiment.

FIG. 8 is a flowchart illustrating operation of the estimation unit 150 according to this embodiment.

In step S501, the estimation unit 150 acquires the high-resolution point cloud data 35 of the immediately preceding frame and the current high-resolution point cloud data 35.

In step S502, the estimation unit 150 calculates the movement amount of the laser sensor 202 based on the depth of the feature point P in each of these adjacent frames. Then, the estimation unit 150 estimates the movement amount of the laser sensor 202 as the movement amount of the mobile object 200. The movement amount is calculated by calculating the amount of change in the depth of the feature point P between the two adjacent frames. The movement amount is calculated assuming that a vector direction in a forward direction of the vehicle is positive. With this method, the amounts of change of a plurality of feature points can be obtained, so that a histogram is created again to exclude outliers, and then an average value is calculated. As a method for excluding outliers, RANSAC used also for feature points can be used.

Description of Effects of this Embodiment

Figure 9:
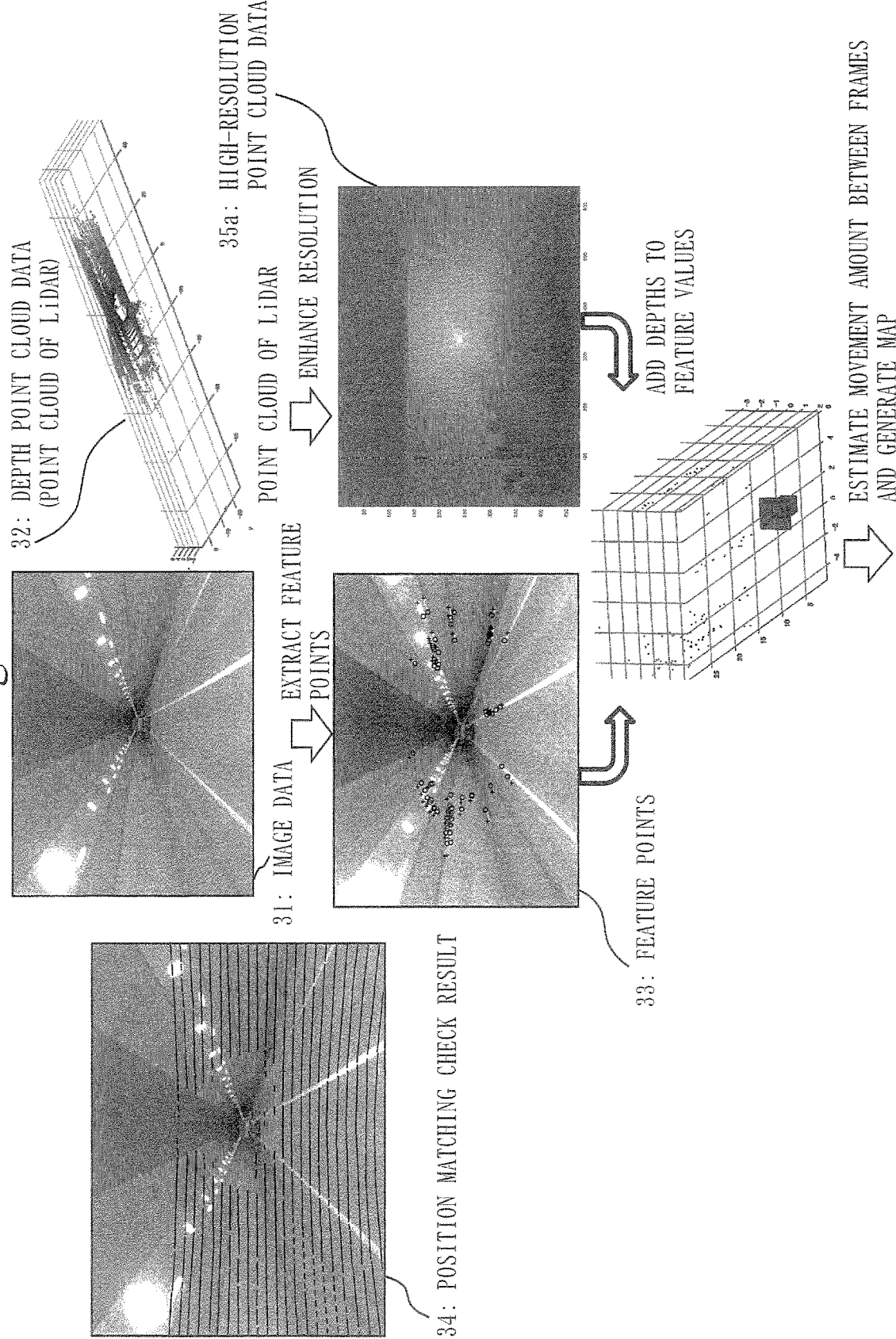
FIG. 9 is a specific example for describing effects of the movement amount estimation device according to the first embodiment.

FIG. 9 is a diagram illustrating a specific example for describing effects of the movement amount estimation device according to this embodiment.

In FIG. 9, it is assumed that the mobile object 200 is traveling in a tunnel where there are not many three-dimensional features.

In the movement amount estimation device according to this embodiment, the depths of feature points in each frame are calculated as distance information. Then, the movement amount estimation device estimates the movement amount of the mobile object by calculating the amount of change in the distance information between adjacent frames. Therefore, it is necessary to acquire the distance information of feature points. However, in a place such as a tunnel where there are not many three-dimensional feature objects, it is generally difficult to acquire feature points from a point cloud of a laser sensor. That is, an array of distance information can be acquired from the point cloud of the laser sensor, but due to lack of three-dimensional features, it is difficult to extract distance information of feature points. In the movement amount estimation device according to this embodiment, feature points are calculated from a camera image, and distance information corresponding to these feature points is calculated using a point cloud of a laser sensor. Then, high-resolution point cloud data can be generated by adding the distance information to the feature points.

As described above, the movement amount estimation device according to this embodiment can generate high-resolution point cloud data in which a camera image and a point cloud obtained by a laser sensor are integrated. Therefore, the movement amount estimation device according to this embodiment can highly accurately estimate the movement amount based on high-resolution point cloud data in which a camera image and a point cloud obtained by a laser sensor are integrated, even in a place where there are no three-dimensional features, such as a tunnel.

*Other Configurations*

<First Variation>

In this embodiment, the depth of each feature point P acquired from the image data 31 is calculated, and the high-resolution point cloud data 35 in which the depth is added to each feature point P is generated. However, as illustrated in FIG. 9, depths may be added to all pixels included in the image data 31 based on the depth point cloud data 32. High-resolution point cloud data 35a in which the depths are added to all the pixels included in the image data 31 may be generated.

<Second Variation>

In this embodiment, the movement amount of the mobile object is estimated by obtaining the amount of change in the depths of feature points between adjacent frames. However, the movement amount of the mobile object can be estimated by obtaining the amount of change in the depths of feature points between frames in which the respective feature points P correspond to each other, even if the frames are not adjacent to each other.

<Third Variation>

In this embodiment, the functions of the image acquisition unit 110, the point cloud acquisition unit 120, the feature extraction unit 130, the generation unit 140, and the estimation unit 150 are realized by software. As a variation, the functions of the image acquisition unit 110, the point cloud acquisition unit 120, the feature extraction unit 130, the generation unit 140, and the estimation unit 150 may be realized by hardware.

Figure 10:
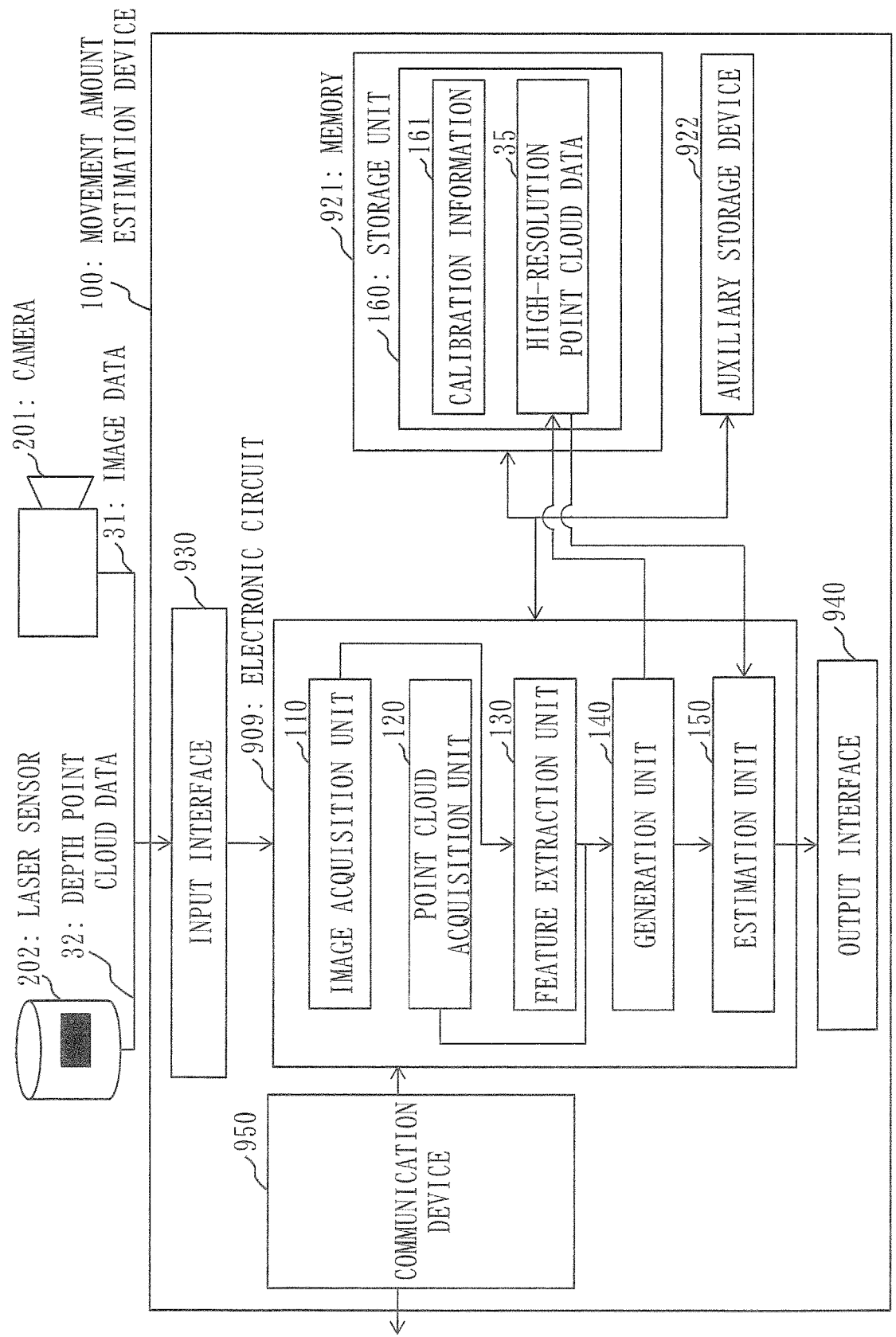
FIG. 10 is a configuration diagram of the movement amount estimation device according to a variation of the first embodiment.

FIG. 10 is a configuration diagram of the movement amount estimation device 100 according to a variation of this embodiment.

The movement amount estimation device 100 includes an electronic circuit 909, the memory 921, the auxiliary storage device 922, the input interface 930, and the output interface 940.

The electronic circuit 909 is a dedicated electronic circuit that realizes the functions of the image acquisition unit 110, the point cloud acquisition unit 120, the feature extraction unit 130, the generation unit 140, and the estimation unit 150.

Specifically, the electronic circuit 909 is a single circuit, a composite circuit, a programmed processor, a parallel-programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array.

The functions of the image acquisition unit 110, the point cloud acquisition unit 120, the feature extraction unit 130, the generation unit 140, and the estimation unit 150 may be realized by one electronic circuit, or may be distributed among and realized by a plurality of electronic circuits.

As another variation, some of the functions of the image acquisition unit 110, the point cloud acquisition unit 120, the feature extraction unit 130, the generation unit 140, and the estimation unit 150 may be realized by the electronic circuit, and the rest of the functions may be realized by software.

As still another variation, some or all of the functions of the image acquisition unit 110, the point cloud acquisition unit 120, the feature extraction unit 130, the generation unit 140, and the estimation unit 150 may be realized by firmware.

Each of the processor and the electronic circuit is also referred to as processing circuitry. That is, in the movement amount estimation device 100, the functions of the image acquisition unit 110, the point cloud acquisition unit 120, the feature extraction unit 130, the generation unit 140, and the estimation unit 150 are realized by the processing circuitry.

In the first embodiment above, the units of the movement amount estimation device are described as independent functional blocks. However, the configuration of the movement amount estimation device may be different from the configuration as in the embodiment described above. The functional blocks of the movement amount estimation device may be arranged in any configuration, provided that the functions described in the above embodiment can be realized. The movement amount estimation device may be a system composed of a plurality of devices, instead of a single device.

A plurality of portions of the first embodiment may be implemented in combination. Alternatively, one portion of this embodiment may be implemented. This embodiment may be implemented as a whole or partially in any combinations.

That is, in the first embodiment, each embodiment may be freely combined, or any constituent element of each embodiment may be modified, or any constituent element may be omitted in each embodiment.

The embodiment described above is an essentially preferable example and is not intended to limit the scope of the present invention, the scope of applications of the present invention, and the scope of intended uses of the present invention. The embodiment described above can be modified in various ways as necessary.

REFERENCE SIGNS LIST

31: image data; 32: depth point cloud data; 33: feature point; 34: position matching check result; 35, 35a: high-resolution point cloud data; 50: polygon; 100: movement amount estimation device; 110: image acquisition unit; 120: point cloud acquisition unit; 130: feature extraction unit; 140: generation unit; 150: estimation unit; 160: storage unit; 161: calibration information; 200: mobile object; 201: camera; 202: laser sensor; 500: movement amount estimation system; 909: electronic circuit; 910: processor; 921: memory; 922: auxiliary storage device; 930: input interface; 940: output interface; 950: communication device; S100: movement amount estimation process.

The invention claimed is:

1. A movement amount estimation device that is mounted on a mobile object and estimates a movement amount of the mobile object, the movement amount estimation device comprising:

processing circuitry to:
  acquire images of an area around the mobile object as image data;
  acquire depth point cloud data representing a depth, which is a distance to an object existing in the area around the mobile object, by a point cloud;
  extract, by a feature point extraction algorithm, feature points in image data of each of two adjacent frames in the acquired image data, extract, as feature points corresponding to each other between the two adjacent frames, a feature point in one of the two adjacent frames and a feature point in the other one of the two adjacent frames that is nearest to the feature point in the one of the two adjacent frames, calculate a distance between pixels of the feature points corresponding to each other between the two adjacent frames so as to extract an outlier of the distance, and when the distance between the feature points corresponding to each other is the outlier, exclude the feature points of the outlier from the feature points in the image data of the two adjacent frames;

calculate a depth to a feature pixel position, which is a position represented by a pixel of each of the feature points, using the image data and the depth point cloud data, and generate high-resolution point cloud data in which the calculated depth is added to the pixel of each of the feature points; and estimate the movement amount of the mobile object, using the high-resolution point cloud data.

2. The movement amount estimation device according to claim 1, wherein the processing circuitry superimposes the image data and the depth point cloud data on each other by transforming a coordinate system of the depth point cloud data into a coordinate system of the image data, selects a polygon that is formed with three points included in the depth point cloud data and contains the pixel that is the feature point, and calculates the depth of the feature pixel position, using the polygon.

3. The movement amount estimation device according to claim 2, wherein the processing circuitry acquires the image data, using a camera mounted on the mobile object, and calculates, as the depth of the feature pixel position, a distance to a point of contact between a plane formed by the polygon and an extended line of a line from a center of the camera to the feature pixel position on the image at an f-number determined depending on a focal length of the camera.

4. The movement amount estimation device according to claim 3, wherein the processing circuitry estimates the movement amount of the mobile object by calculating an amount of change in the depth of the feature pixel position, using a plurality of frames.

5. The movement amount estimation device according to claim 2, wherein the processing circuitry estimates the movement amount of the mobile object by calculating an amount of change in the depth of the feature pixel position, using a plurality of frames.

6. The movement amount estimation device according to claim 1, wherein the processing circuitry estimates the movement amount of the mobile object by calculating an amount of change in the depth of the feature pixel position, using a plurality of frames.

7. A movement amount estimation method of a movement amount estimation device that is mounted on a mobile object and estimates a movement amount of the mobile object, the movement amount estimation method comprising:

acquiring images of an area around the mobile object as image data;

acquiring depth point cloud data representing a depth, which is a distance to an object existing in the area around the mobile object, by a point cloud;

extracting, by a feature point extraction algorithm, feature points in image data of each of two adjacent frames in the acquired image data, extracting, as feature points corresponding to each other between the two adjacent frames, a feature point in one of the two adjacent frames and a feature point in the other one of the two adjacent frames that is nearest to the feature point in the one of the two adjacent frames, calculating a distance between pixels of the feature points corresponding to each other between the two adjacent frames so as to extract an outlier of the distance, and when the distance between the feature points corresponding to each other is the outlier, excluding the feature points of the outlier from the feature points in the image data of the two adjacent frames;

calculating a depth to a feature pixel position, which is a position represented by a pixel of each the feature points, using the image data and the depth point cloud data, and generating high-resolution point cloud data in which the calculated depth is added to the pixel of each of the feature points; and estimating the movement amount of the mobile object, using the high-resolution point cloud data.

8. A non-transitory computer readable medium storing a movement amount estimation program for a movement amount estimation device that is mounted on a mobile object and estimates a movement amount of the mobile object, the movement amount estimation program causing the movement amount estimation device, which is a computer, to execute:

an image acquisition process of acquiring images of an area around the mobile object as image data;

a point cloud acquisition process of acquiring depth point cloud data representing a depth, which is a distance to an object existing in the area around the mobile object, by a point cloud;

a feature extraction process of extracting, by a feature point extraction algorithm, feature points in image data of each of two adjacent frames in the acquired image data, extracting, as feature points corresponding to each other between the two adjacent frames, a feature point in one of the two adjacent frames and a feature point in the other one of the two adjacent frames that is nearest to the feature point in the one of the two adjacent frames, calculating a distance between pixels of the feature points corresponding to each other between the two adjacent frames so as to extract an outlier of the distance, and when the distance between the feature points corresponding to each other is the outlier, excluding the feature points of the outlier from the feature points in the image data of the two adjacent frames;

a generation process of calculating a depth to a feature pixel position, which is a position represented by a pixel of each of the feature points, using the image data and the depth point cloud data, and generating high-resolution point cloud data in which the calculated depth is added to the pixel of each of the feature points; and an estimation process of estimating the movement amount of the mobile object, using the high-resolution point cloud data.

\* \* \* \* \*